US009983958B2

(12) United States Patent
Bhat et al.

(10) Patent No.: US 9,983,958 B2
(45) Date of Patent: May 29, 2018

(54) TECHNIQUES FOR DYNAMICALLY CONTROLLING RESOURCES BASED ON SERVICE LEVEL OBJECTIVES

(71) Applicant: NETAPP, INC., Sunnyvale, CA (US)

(72) Inventors: Onkar Bhat, Sunnyvale, CA (US); Ravi Budhia, Sunnyvale, CA (US); Rajesh Desai, Sunnyvale, CA (US); Abhishek Naidu, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 476 days.

(21) Appl. No.: 14/341,068

(22) Filed: Jul. 25, 2014

(65) Prior Publication Data
US 2016/0026535 A1    Jan. 28, 2016

(51) Int. Cl.
*G06F 17/30*   (2006.01)
*G06F 11/20*   (2006.01)
*G06F 11/14*   (2006.01)

(52) U.S. Cl.
CPC ...... *G06F 11/2035* (2013.01); *G06F 11/2048* (2013.01); *G06F 11/2097* (2013.01); *G06F 11/1461* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 7,940,756 B1 * | 5/2011 | Duffy | .................... | H04L 41/50 370/235 |
| 8,117,235 B1 * | 2/2012 | Barta | .................... | G06F 3/0607 707/635 |
| 8,504,691 B1 * | 8/2013 | Tobler | .................... | H04L 67/02 370/229 |
| 2002/0174227 A1 * | 11/2002 | Hartsell | ............. | H04L 12/5695 709/226 |
| 2003/0036886 A1 * | 2/2003 | Stone | ................. | G06F 11/0715 702/188 |
| 2004/0243699 A1 * | 12/2004 | Koclanes | ............... | H04L 29/06 709/224 |
| 2006/0129687 A1 * | 6/2006 | Goldszmidt | ........... | G06F 9/505 709/229 |
| 2006/0236061 A1 * | 10/2006 | Koclanes | ............. | G06F 3/0605 711/170 |
| 2008/0046538 A1 * | 2/2008 | Susarla | ................... | G06F 3/061 709/217 |
| 2013/0007234 A1 * | 1/2013 | Bartfai-Walcott | .. | H04L 47/2433 709/223 |
| 2014/0160929 A1 * | 6/2014 | Wu | ................... | H04W 72/1257 370/235 |

* cited by examiner

*Primary Examiner* — Aleksandr Kerzhner
*Assistant Examiner* — Eddy Cheung
(74) *Attorney, Agent, or Firm* — Cooper Legal Group, LLC

(57) ABSTRACT

Various embodiments are generally directed an apparatus and method for receiving a recovery point objective for a workload, the recovery point objective comprising an amount of time in which information for the workload will be lost if a failure occurs, and determining a service level objective for a replication transfer based on the recovery point objective, the replication transfer to replicate information on a destination node to maintain the recovery point objective. Various embodiments include dynamically controlling one or more resources to replicate the information on the destination node based on the service level objective and communicating information for the replication transfer from the source node to the destination node.

25 Claims, 12 Drawing Sheets

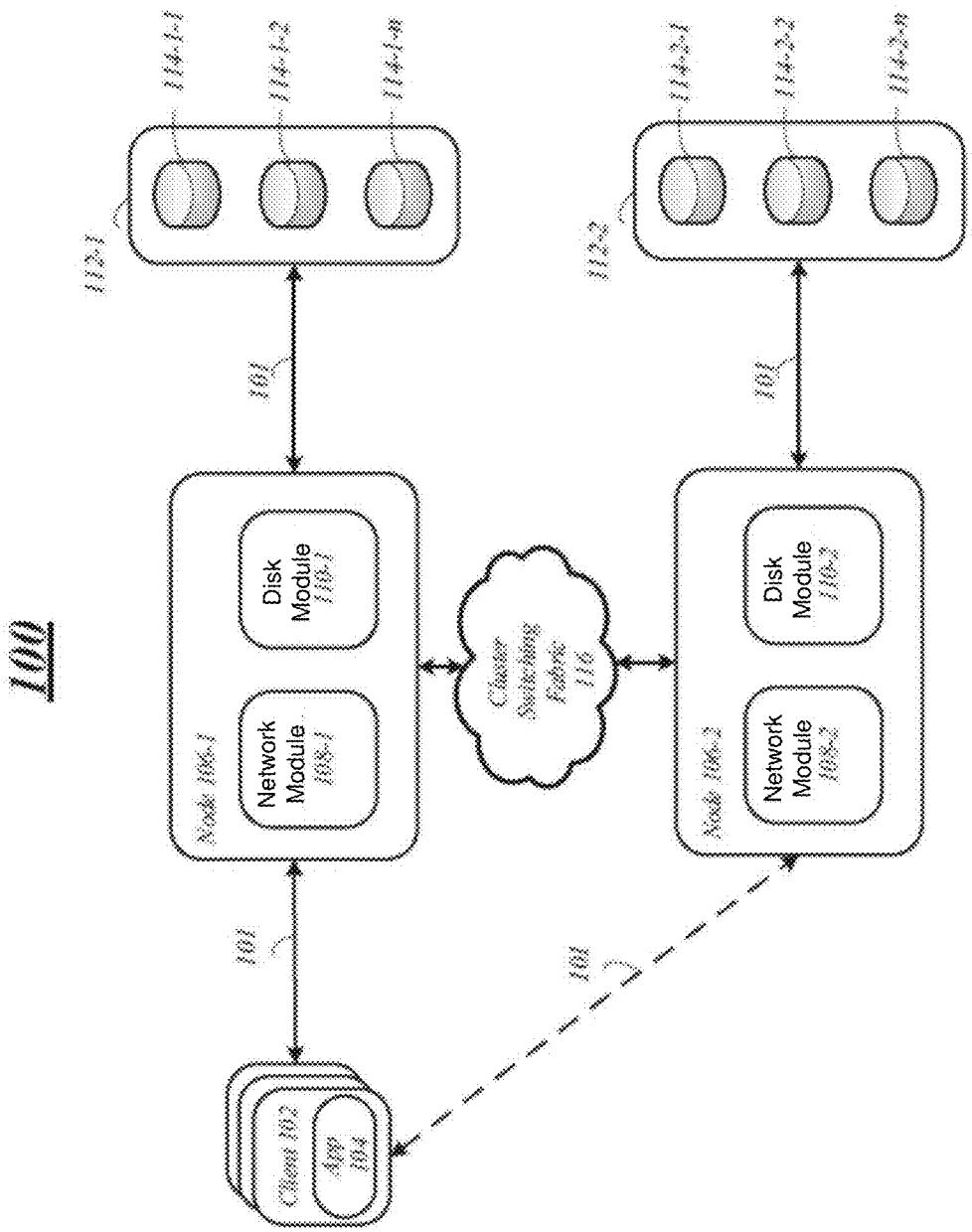

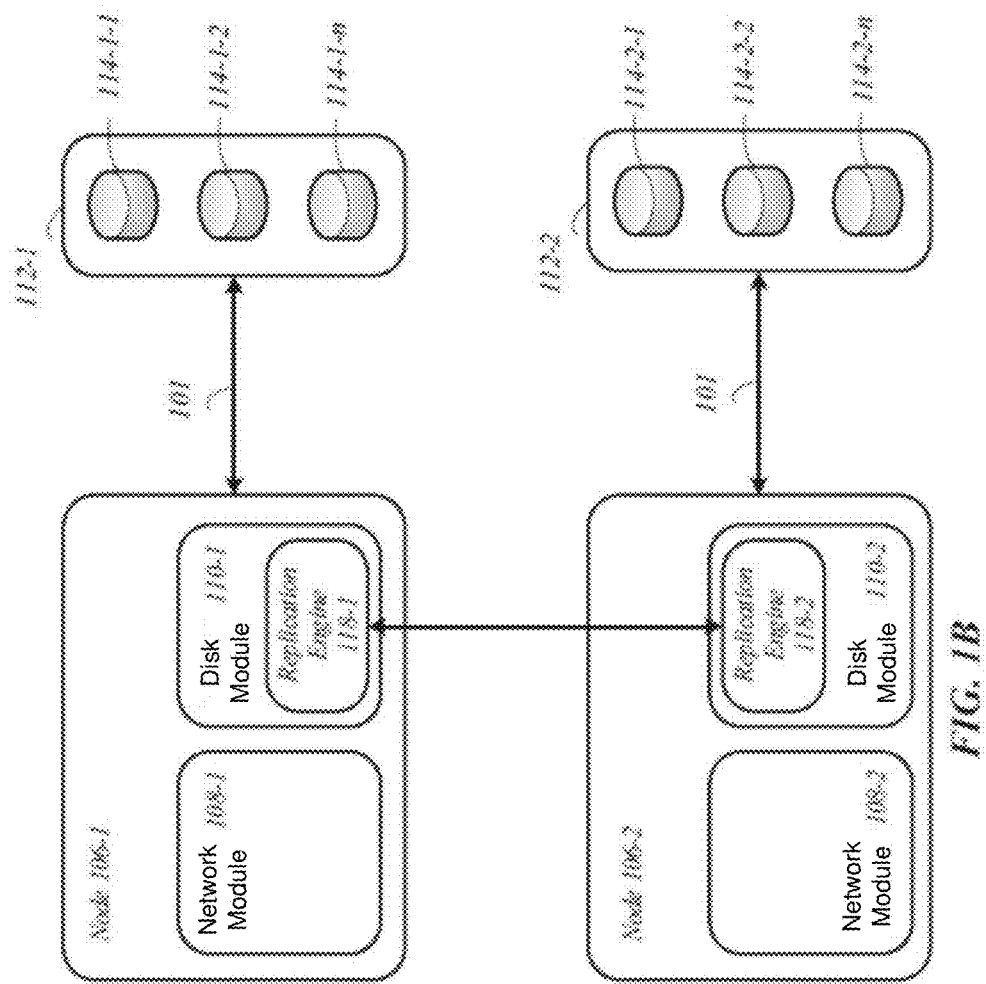

| | Workload 402-1 | Workload 402-2 | Workload 402-3 |
|---|---|---|---|
| RPO Setting 502 | 12 Minutes | 1 Hour | 4 Hour |
| SLO Setting 504 | Premium | Standard | Value |
| Priority Level 506 | Highest Level | Middle Level | Lowest Level |
| Replication Schedule 508 | 3 Minutes | 30 Minutes | 2 Hour |

RECEIVE A RECOVERY POINT OBJECTIVE FOR A WORKLOAD, THE RECOVERY POINT OBJECTIVE COMPRISING AN AMOUNT OF TIME IN WHICH INFORMATION FOR THE WORKLOAD WILL BE LOST IF A FAILURE OCCURS
605

DETERMINE A SERVICE LEVEL OBJECTIVE FOR A REPLICATION TRANSFER BASED ON THE RECOVERY POINT OBJECTIVE, THE REPLICATION TRANSFER TO REPLICATE INFORMATION ON A DESTINATION DEVICE TO MAINTAIN THE RECOVERY POINT OBJECTIVE
610

DYNAMICALLY CONTROL RESOURCES TO REPLICATE THE INFORMATION ON THE DESTINATION DEVICE BASED ON THE SERVICE LEVEL OBJECTIVE
615

COMMUNICATE INFORMATION FOR THE REPLICATION TRANSFER FROM A SOURCE DEVICE TO THE DESTINATION DEVICE
620

*FIG. 6*

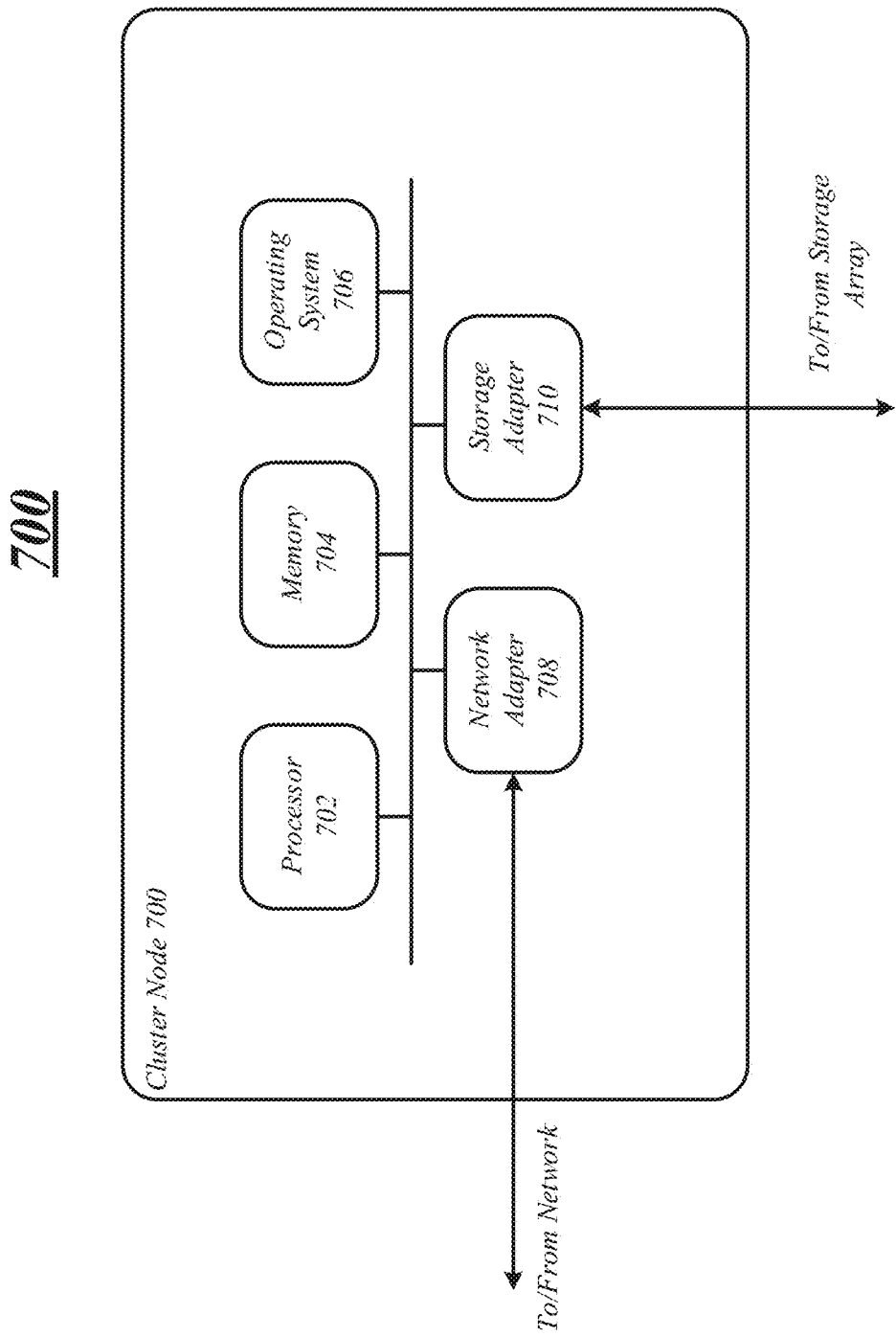

TECHNIQUES FOR DYNAMICALLY CONTROLLING RESOURCES BASED ON SERVICE LEVEL OBJECTIVES

TECHNICAL FIELD

Embodiments described herein generally relate to controlling resources in clustered systems. In particular, embodiments relate to controlling resources based on service level objectives in a cluster system environment.

BACKGROUND

Clustered storage systems may store and provide information to one or more computing systems in a network, such as a storage area network (SAN). More specifically, a computing system may write information to a storage system and read information from the storage system over one or more network connections. These clustered storage systems may include storage devices, such as disks, in an array to store the information.

The information stored on the clustered storage systems may be critical and important to clients utilizing the clustered storage system. Thus, the clustered storage systems may provide backup services to the clients. More specifically, a backup or a copy of the information may be stored on the clustered storage system and in some instances on separate storage devices than where the original information is stored. However, if not managed properly, copying or transferring the information between storage devices in the clustered storage system may use resources and affect the reading and writing of the information between the clustered storage system and the computing system.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1A illustrates an exemplary embodiment of a storage computing system.

FIG. 1B illustrates a second exemplary embodiment of a storage computing system.

FIG. 5A illustrates an exemplary embodiment of a table.

FIG. 6 illustrates an exemplary embodiment of a logic flow.

FIG. 7 illustrates an exemplary embodiment of a computing system.

DETAILED DESCRIPTION

Figure 1C:
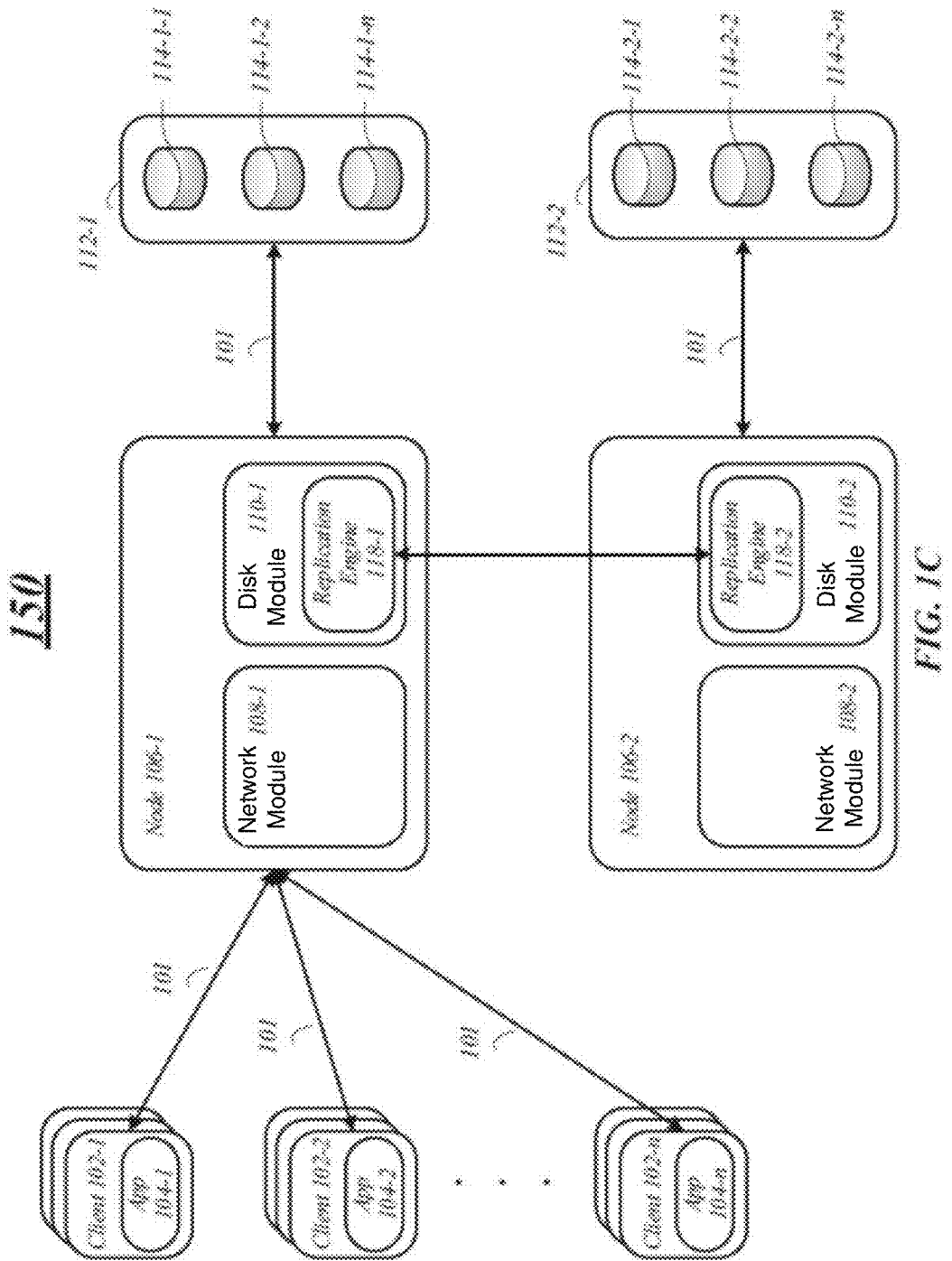
FIG. 1C illustrates a third exemplary embodiment of storage computing system.

Various embodiments are generally directed to an apparatus, system and method for controlling resources for processing and communicating replication transfers for workloads and client traffic between computing systems. For example, a system may provide various services, such as processing capabilities and storage services to client workloads. In instances, a user or client of the system may desire to create a backup, copy or replication of the workload to prevent a loss of information if a failure were to occur. Thus, some embodiments may use replication transfers to copy or replicate information for the workload from one computing system to another computing system to create a backup or secondary copy of the workload. When these replication transfers are communicated from one system to another system, resources such as processing components, memory, and networking infrastructure are used. The use of these resources may affect other replication transfers and client traffic due to resource limitations. The communication of the replication transfers for workloads may need to be balanced with the communication of other replication transfers and client traffic.

As will be discussed in more detail below, some embodiments are directed to controlling these resources based on recovery point objectives (RPO) and service level objectives (SLO) for workloads. A RPO may be an amount of time in which information for the workload may be lost if the file system becomes corrupted, data is lost, or a failure occurs and may be determined by a system administrator, a user or client of the system, or by the system itself. The RPO may be used to determine a SLO for workloads and for controlling resources. More specifically, the SLOs may be defined into different categories based on the objectives of the user and may be used as relative priority levels between each other to control resources. For example, there may be a premium SLO having a highest priority level, a standard SLO having a medium priority level, and a value SLO having the lowest priority level. In one example, replication transfers for a workload having a premium SLO may be allocated more resources than replication transfers for workloads having a standard SLO or value SLO. In another example, replication transfers for a workload having a standard SLO may be assigned more resources than replication transfers for workloads having a value SLO. These and other details will be discussed below with reference to the figures.

Various embodiments also relate to apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a general overview of an exemplary cluster system 100 including a plurality of nodes 106-*n* configured to provide processing and storage services on a plurality of storage devices 114-*n* for one or more client devices 102-*n*, where n may be any positive integer. In the exemplary embodiment, FIG. 1A illustrates a client 102 coupled with nodes 106-1 and 106-2 through one or more network connections 101. In some embodiments, the one or more network connections 101 may include any type of wired or wireless connection or combination thereof. The client 102 may communicate any type of information to the nodes 106 for storage on one or more storage devices 114 in a storage array 112 over the one or more network connections 101.

Nodes 106 may include any number of functional components that cooperate to provide distributed storage system architecture of cluster system 100. Each node 106 is generally organized as a network element (Network Module 108) and a storage device element (and Disk Module 110). The Network Module 108 includes functionality that enables node 106 to connect to the 102 over one or more network connections, while each and Disk Module 110 connects to one or more storage devices 114 or a storage array 112 having a plurality of storage devices 114.

The client 102 may communicate over any type of network connections 101 including an Ethernet network, a Fibre Channel (FC) network or any other network type. Moreover, the nodes 106 may be interconnected by a cluster switching fabric 116 which, in the illustrative embodiment, may be embodied as a Gigabit Ethernet switch or any other interconnect type.

It should be noted that while there is shown an equal number of Network and Data Modules in the illustrative cluster system 100, there may be differing numbers of Network and/or Data Modules in accordance with various embodiments of the present disclosure. For example, there may be a plurality of Network Module and/or Data Modules interconnected in a cluster system 100 that does not reflect a one-to-one correspondence between the Network and Data Modules. As such, the description of a node 106 comprising one Network Module and one Disk Module should be taken as illustrative only.

Clients 102-*n* may be any type of computing device having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 102-*n* may be configured to interact with a node 106 in accordance with a client/server model of information delivery. That is, each client 102 may request the services of the node 106, and node 106 may return the results of the services requested by the client 102 over a network including one or more network connections 101. Clients 102-*n* may be configured to execute processor executable instructions, shown as application 104 for reading and writing information at storage devices 114-*n*. Such application 104 may include a database application, a financial management system, an electronic mail application or any other application type.

Clients 102-*n* may issue packets using application 104 including file-based access protocols, such as the Common Internet File System ("CIFS") protocol or the Network File System ("NFS") protocol, over the Transmission Control Protocol/Internet Protocol ("TCP/IP") when accessing information in the form of certain data containers. Alternatively, the clients 102-*n* may issue packets using application 104 including block-based access protocols, such as the Small Computer Systems Interface ("SCSI") protocol encapsulated over TCP ("iSCSI") and SCSI encapsulated over Fibre Channel ("FCP"), when accessing information in the form of other data containers, such as blocks.

In one example, one or both of Network Module 108 and Disk Module 110 execute a plurality of layers of a storage operating system. These layers may include a file system manager that keeps track of a directory structure (hierarchy) of the data stored in storage devices 114 and manages read/write operations, i.e. executes read/write operations on storage devices in response to client 102 requests.

In cluster system 100, for storing and retrieving information, it is sometimes advantageous to replicate or duplicate all or part of a file system for a workload. For example, one purpose for duplicating a file system is to maintain a backup copy of the file system to protect against lost information. Another purpose for duplicating a file system is to provide replicas of the data in the file system at multiple servers to share load incurred in accessing that data. The file system may be replicated by utilizing one or more replication transfers.

One common way of replicating a file system is by taking "snapshots" which means a point in time copy of a storage file system. A snapshot may be a persistent point in time (PPT) image of an active file system that enables quick recovery of data after data has been corrupted, lost, or altered. Snapshots can be created by copying data from a storage volume at each predetermined point in time to form a consistent image, or virtually by using a pointer to form the image of the data. Often, information is copied (or mirrored) from a source storage array to a destination storage array.

The cluster system 100 may replicate a workload or changes in the file system on a periodic, non-periodic, continuous, or non-continuous basis. The replication of the workload may be based on a recovery point objective (RPO), i.e. an amount of time in which information for the workload may be lost if the file system becomes corrupted, data is lost, or a failure occurs. In some examples, the RPO may be configured by a system administrator of the system or a user whose information is being maintained on the system. In various embodiments, the RPO may be in any unit of time such as seconds, minutes, hours, or days based upon various criteria, such as the needs of the user and the information maintained on the cluster system 100. For example, a user may desire and set a low RPO, such as four minutes, when critical information in being hosted by the cluster system 100. In this example, if a failure were to occur, only information stored on the cluster system 100 during the four minutes prior to the failure may be lost in a worst-case scenario. On the other hand, a client may desire and set a high RPO such as one hour for less critical information. In this example, information sent to the cluster system in last hour may be lost in a worst-case scenario.

The RPO may be used to determine a service level objective (SLO) for the workload hosted by the cluster system 100. The SLO may be a policy-based storage management system to help evaluate and maintain an adequate level performance for a cluster system. The SLO may be a set of one or more values relating to one or more specific measurable performance characteristics and specifying one or more desired or required levels of service to be provided to an application or a set of applications. Some common SLO characteristics are, for example, latency, cost, protection against local failures or corruption, geographic dispersion, efficiency, throughput, etc. A SLO, therefore, can be defined in terms of any one or more of these characteristics, and other characteristics. By monitoring a cluster system's actual performance relative to a SLO, it can be determined whether the system is performing adequately, and adjustments to the state of the cluster system can be made if it is not.

In various embodiments, the SLOs may be defined into different categories based on the objectives of the user. For example, there may be a premium SLO, a standard SLO, and a value SLO. The cluster system may use these SLOs to determine the allocation of the usage of resources, such as one or more processors, memory, networking interfaces, etc. More specifically, processing cycles on the processors, memory read/writes and network bandwidth may be allocated to workloads. The SLOs may be based on the needs of the user and the services provided by the service provider. For example, a user may choose a premium SLO when critical information is stored on the system, high bandwidth and low latency communications are desired, a high number of users may access the information at one time, and so forth. Various pricing structures may be configured around the SLOs. For example, the premium SLO may be the most expensive SLO to maintain and the value SLO may be the least expensive to maintain.

The SLO may be chosen by the user of the system, a system administrator or determined from other low level objectives, such as the RPO. In some embodiments, the SLOs may define a range of times for RPOs. For example, a premium SLO may have a range of zero to 16 minutes for RPOs, a standard SLO may have a range of greater than 16 minutes to four hours for RPOs, and a value SLO may have a range of any time greater than four hours for RPOs. Thus by way of example, if the RPO is four minutes, the SLO may be the premium SLO. In another example, if the RPO is set to one hour, the SLO may be the standard SLO. In various embodiments, the SLOs are not limited to these ranges and the SLOs may be defined differently.

Further, the SLOs may be used as a relative priority level for allocating resources for workloads. In some embodiments, the premium SLO may have the highest priority level, the standard SLO may have a middle priority level and the value SLO may have a lower priority level. As will be discussed in more detail below, these relative priority levels may be used to allocate the usage of resources, such as processing usage, memory usage, network, and so forth.

FIG. 1B illustrates a source storage array 112-1 that may be used to store information of one or more storage volumes. The source storage array 112-1 may store workloads for any number of storage volumes associated with any number of client devices 102 and users. The source storage array 112-1 is managed by node 106-1 that provides access to storage array 112-1 to one or more client devices 102.

In one embodiment, a replication engine 118 (shown as 118-1 for node 106-1 and 118-2 for node 106-2) may be used to transfer information from source array 112-1 to destination array 112-2 via one or more wired or wireless network connections, which may be similar to the cluster switching fabric 116. The replication engine 118 may use a generic file and/or block-based "agnostic" protocol having a collection of methods/functions constituting one or more application programming interfaces (APIs) for transferring information from the source array 112-1 to the destination array 112-2 as replication transfers. Example of such an agnostic protocol is the SpinNP protocol available from NETAPP, INC. The embodiments disclosed herein are not limited to any particular protocol/standard for transferring the information from the source array 112-1 to the destination array 112-2.

One challenge for transferring information from the source array 112-1 to the destination array 112-2 using the replication engine 118 is that it may negatively impact processing of clients 102 transfer requests for reading or writing information because the replication engine 118 requires access to the storage devices 114 for transferring information and conducting replication transfers. The negative impact may be due to lower data transfer rates to client devices or delay (i.e. latency) in executing read and write operations. Embodiments disclosed herein provide an optimum system/methodology for handling client device related operations as well as performing transfer operations for transferring information from source array 112-1 to destination array 112-2 in a balanced manner based on RPOs and SLOs.

FIG. 1C illustrates a cluster system 100 that may provide services to a plurality of client devices 102-1 through 102-n, where n could be any integer greater than zero. Each client device 102 may be serviced by source node 106-1 and may have a particular workload on a particular storage volume on the storage array 112-1. More specifically, each client device 102 may have a workload and a storage volume on the storage array 112-1 to store information and data. Thus, the cluster system 100 may need to manage and control multiple replication transfers at one time and for a plurality of workloads.

The source node 106-1 or destination node 106-2 may manage the workloads and replication transfers for each of the client devices 102 based on RPOs and SLOs established for the workloads. More specifically, each workload may have an associated RPO and SLO that is handled by the source node 106-1 or destination node 106-2 and information stored on the storage array 112-1. The relative priority levels of the SLOs may be used by the source node 106-1 or destination node 106-2 to schedule and control replication transfers for the workloads.

The cluster system 100 may use the priority levels to control the usage of resources such as memory allocation, processing cycle allocations, networking allocations including transfer rates or throughput, I/O latency, and the frequency of replications for the workloads relative to teach other and client traffic. For example, a workload may have a premium SLO and have a higher priority level than a different workload having a standard or value SLO. In this example, the workload having the premium SLO may be provided with additional resources than workloads having the lower priority level based on the standard or value SLO. The additional resources may include, additional processing usage, additional memory usage, additional network bandwidth, and so forth. In some embodiments, replication transfers for workloads having a premium SLO may compete evenly with client traffic. Moreover, client traffic will not be given priority over the replication transfer associated with a workload with a premium SLO.

In another example, a workload may have a standard SLO and may be provided with more resources than a workload having a value SLO, but fewer resources than a workload having a premium SLO. The workload having the standard SLO may also be provided with fewer resources than client traffic or provided with an amount of resources such that a latency requirement for the client traffic may be maintained.

In a third example, a workload may have a value SLO and all other traffic including other replication transfers and client traffic will have a higher priority level and assigned more resources. In addition, workloads having the same SLO, such as two workloads having value SLO, will compete evenly for resources.

Figure 1D:
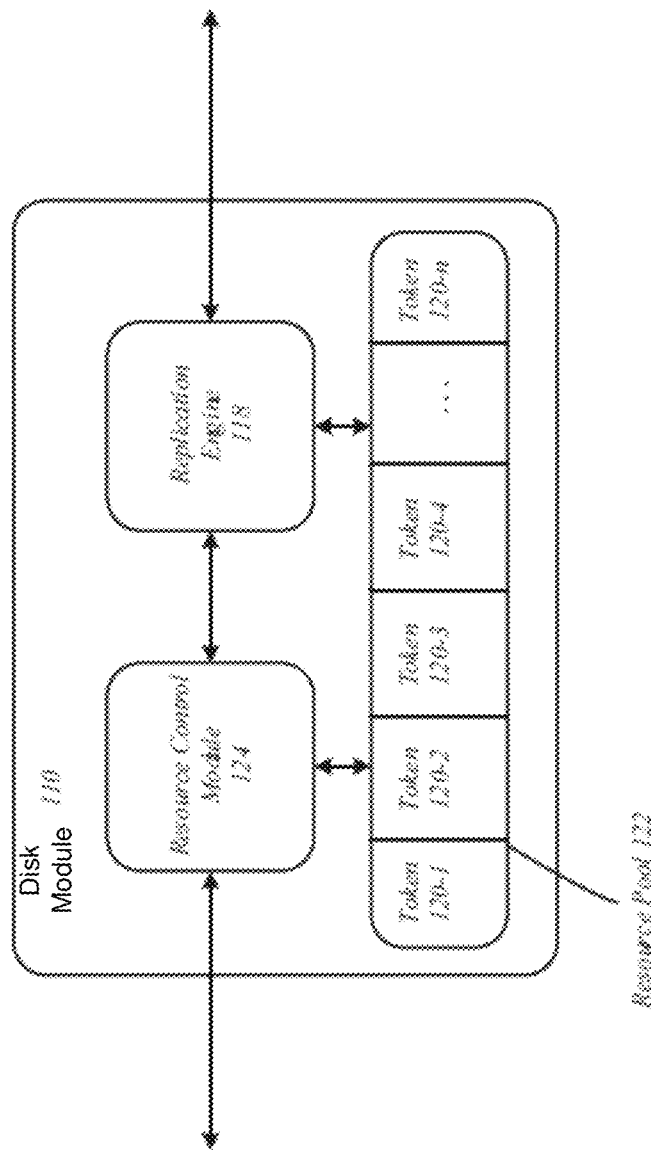
FIG. 1D illustrates a fourth exemplary embodiment of a storage computing system.

FIG. 1D shows an example of a system executed by Disk Module 110 for efficiently controlling and managing replication transfers from the source storage array 112-1 to the destination storage array 112-2, according to embodiments. The Disk Module 110 may manage and control resource allocations using a token system. More specifically, the Disk Module 110 may maintain a resource pool 122 having a plurality of tokens 120-1-120-*n*, where n could be any positive integer. The total number of available tokens, i.e. 120-1-120-*n* at any given time may be limited by a maximum threshold value. The maximum threshold value may be an upper limit beyond which the system cannot allocate any more tokens to the replication engine 118. In some embodiments, the number of tokens 120 in the resource pool 122 may be adjusted between the maximum threshold value and a minimum threshold value based on resources available, client traffic and replication traffic. For example, the number of tokens 120 may be reduced in the resource pool 122 to decrease client traffic latency. In another example, the number of tokens 120 may be increased when bandwidth is available and client traffic latency is low. Various embodiments are not limited to these examples.

In some embodiments, a token is a data structure that includes a message data structure which the replication engine 118 obtains to make a transfer request to a storage array for reading or writing information. The message data structure may be used to read information at source storage array 112-1 or write to the destination storage array 112-2. The tokens are an indicator or permission for the replication engine 118 to present to a storage operating system to access storage devices at the source array 112-1 and/or destination array 112-2 for transferring information from the source array 112-1 to the destination array 112-2. In some embodiments, the processes and systems disclosed herein optimize allocation of tokens 120-1 through 120-*n*.

The Disk Module 110 may include a resource control module 124 to manage and control the usage of resources on the cluster system 100. In some embodiments, the resource control module 124 may control the usage of resource by controlling the allocation of tokens for one or more replication transfers, the frequency in which the tokens are allocated to the replication transfers and the schedule for replication transfers. The resource control module 124 may determine the number of tokens and frequency of allocation based on a number of factors such as, client traffic, client latency, other replication transfer, RPOs, SLOs, and so forth.

In some embodiments, the resource control module 124 may manage and control replication transfers relative to each other. More specifically, the resource control module 124 may allocate tokens to replication transfers based on a SLO associated with each of the replication transfers. For example, a replication transfer having a premium SLO may receive more tokens in a time period than a replication transfer having a standard or value SLO. In another example, a replication transfer having a standard SLO may receive more tokens in a time period than a replication transfer having a value SLO, but less tokens in the time period than a replication transfer having a premium SLO.

The resource control module 124 may also allocate tokens to replication transfers to manage client traffic and client traffic latency. For example, the resource control module 124 may limit the number of tokens allocated to a replication transfer having a standard or value SLOs to maintain a client traffic latency requirement. The resource control module 124 may monitor client traffic latency and adjust token allocations to workloads to maintain the client traffic latency requirement. However in some embodiments, the resource control module 124 may not limit the amount of tokens allocated to replication transfer having a premium SLO even when client traffic is experiencing high latency. Replication transfers having the premium SLOs may have the same or higher priority level as client traffic and may compete evenly with the client traffic.

The resource control module 124 may also allocate tokens to replication transfers to control the allocation of resources to workloads. More specifically, the tokens may be used to control the processing usage, memory usage and network usage for the workloads. For example, workloads having a higher priority SLO, such as a premium SLO, may be assigned more tokens than a workload having a lower priority SLO to control the number of processing cycles, memory usage and networking usage. A higher number of tokens to workloads may allow the workload to utilize more processing cycles, memory, and networking than a workload allocated less tokens.

In various embodiments, the resource control module 124 may also determine a schedule for replication transfers for workloads based on RPOs. Each replication transfer may update information on the destination node 106-2 and storage array 112-2. To maintain a RPO for a workload the resource control module 124 must determine how often to conduct a replication transfer or an update on the destination node 106-2. Typically, a workload having a lower RPO, such as four minutes, will use more replication transfers than a workload having a higher RPO, such as one hour.

The resource control module 124 may schedule replication transfers or updates as a fraction of the RPO. More specifically, when the RPO is less than four minutes or greater than 16 minutes a replication transfer for a workload may start every RPO/2. When the RPO is greater than four minutes and less than 16 minutes a replication transfer for a workload may start every RPO/4. By way of example, if the RPO is set to 12 minutes for a workload, the replication transfer is scheduled to occur every 12 minutes/4 or every three minutes. In another example, if the RPO is three minutes for a workload, the recovery transfer is scheduled to occur every 3 minutes/2 or every one and a half minutes. However, various embodiments are not limited in this manner and the resource control module 124 may schedule replication transfers based on any fraction of the RPO.

The resource control module 124 may monitor each replication transfer to determine if the transfer completes before the next scheduled replication transfer. If the replication transfers are completing within the time slices between each replication transfer, the resource control module 124 may maintain the replication transfer schedule for the workload. However, if the replication transfers are not completing within the time slices between each replication transfer, the resource control module 124 may increase the frequency in which replication transfers occur for a workload. In some embodiments, the resource control module 124 may increase the frequency in which the replication transfers occur until the point in which they finish within a time slice.

In some embodiments, the resource control module 124 may also adjust the schedule for the replication transfer when the replication transfer finishes too quickly. For example, if the replication transfer finishes in less than half the time allotted to it, the resource control module 124 may lengthen the time between replication transfers for the workload or may skip the next scheduled replication transfer for the workload.

The resource control module 124 may also initialize an alert to a user or system administrator when a certain percentage of replication transfers fail to complete within the time slice allocated to the replication transfer. For example, the resource control module 124 may issue an alert when more than ten percent (10%) of the replication transfers for a workload fail to finish within the allotted time. Various embodiments are not limited to this example and a user may set or adjusted the threshold at which the alert is issued.

Figure 2:
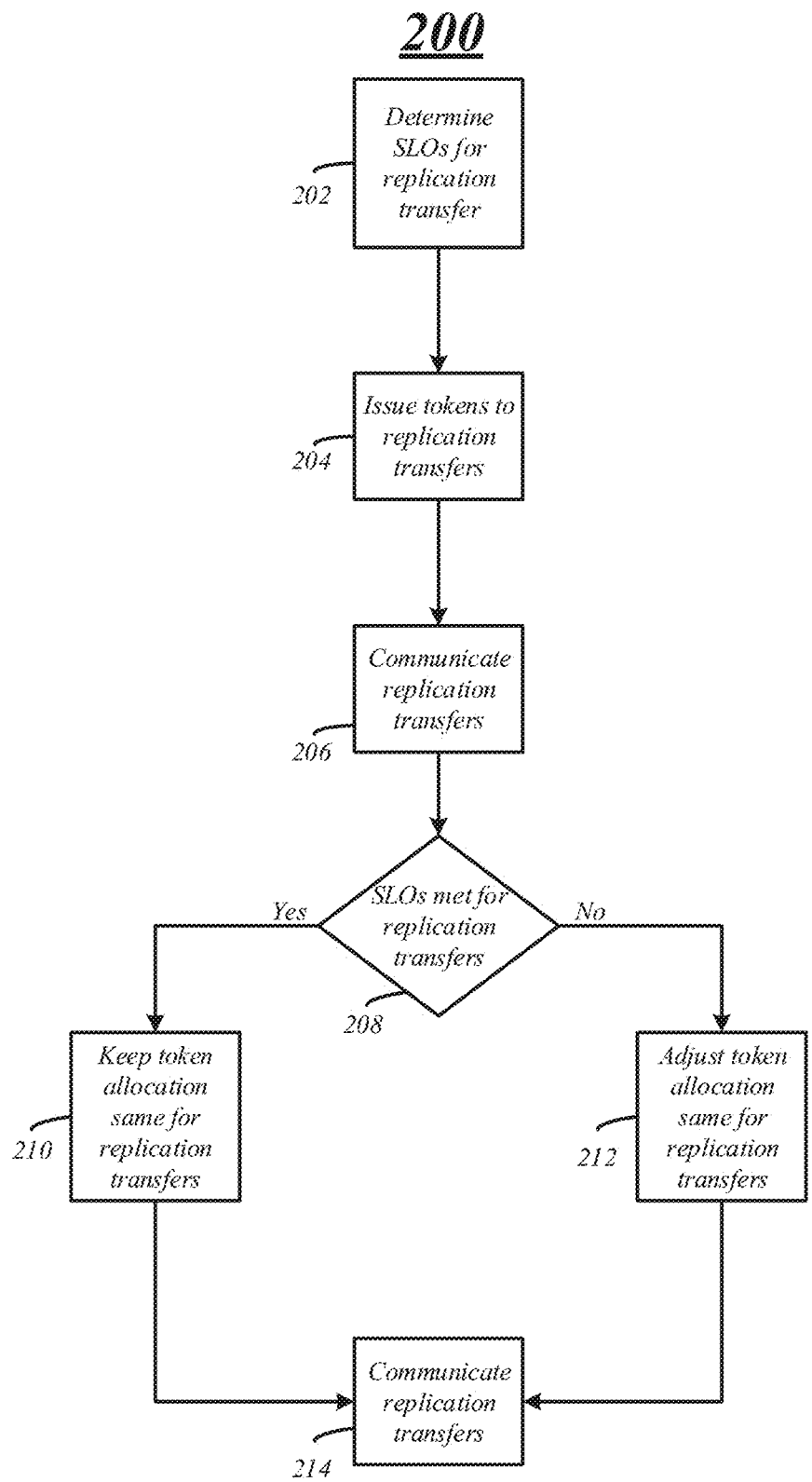
FIG. 2 illustrates a logic flow to communicate replication transfer.

FIG. 2 illustrates one exemplary embodiment of a logic flow 200 for assigning tokens to workloads to replicate information on a backup or destination storage array. Logic flow 200 may be representative of some or all of the operations executed by one or more embodiments described herein. Logic flow 200 is discussed with reference to the cluster system of FIGS. 1A-1D for illustrative purposes. However, various embodiments are not limited in the manner and the logic flow may be implemented on any computing system or device.

At block 202, a SLO may be determined for one or more workloads serviced by a cluster system. The SLO may be determined for the workloads based on a user or system administrator configuration or defined characteristics. For example, a user may define a premium SLO for a particular workload on the cluster system. However, in another example, one or more modules, such as the resource control module 124 may determine the SLO based on a characteristic or setting for the workload, such as the RPO. As previously discussed, each SLO may have a defined range for the RPO and the SLO may be determined by which range the RPO falls within.

In various embodiments, tokens 120 may be issued from a token pool 122 to workloads to communicate replication transfers at block 204. A token 120 is a data structure that includes a message data structure, which the replication engine 118 obtains from the resource control module 124 to make a transfer request to a storage array for reading or writing information. The message data structure may be used to read information at source storage array 112-1 or write to the destination storage array 112-2. The resource control module 124 may issue tokens 120 to the workloads based on the SLO determined for the workload. For example, a workload having a premium SLO may receive more tokens than a workload having a standard SLO or a value SLO.

At block 206, the replication engine 118 may communicate the replication transfers based on the allocation of tokens for the workloads. The replication transfers may be communicated as one or more messages, packets, other data transfers, and so forth using any protocol by the replication engine 118-1 of the source node 106-1 to the replication engine 118-2 of the destination node 106-2. Each message or packet may be read from a source array 114-1 when a token is issued for the workload and may be written to the destination array 114-2 when another token is issued for the workload. As previously discussed, the allocation of resources may be controlled via the allocation of tokens. Workloads having a higher priority level SLO will be issued more tokens than workloads having a lower priority level SLO.

In some embodiments, the resource control module 124 may determine if the SLO for the one or more workloads is being maintained at block 208. More specifically, the resource control module 124 may determine if characteristics, such as the RPO, associated with the SLO are being met. The RPO may be met when the replication transfer for the workload is completely communicated or transferred from the source node 106-1 to the destination node 106-2 in an allocated time slice, i.e. before the next replication transfer for the workload is to occur. Various embodiments are not limited to this example and other SLO characteristics, such as client traffic latency, cluster system uptime, processing cycle, input/outputs operations and so forth may also be monitored to determine of the SLO is being met.

If the SLOs for the one or more workloads are being maintained, the resource control module 124 may continue to issue tokens to the workloads without adjustments at block 210. In other words, the SLOs are being met for the workloads and no adjustments are needed to the allocation of tokens for the replication transfers for the workloads. However, if the SLOs for one or more workloads are not being maintained at block 208, the resource control module 124 may adjust the allocation of tokens for replication transfers. For example, if the RPO for a workload is not being maintained, the resource control module 124 may allocate additional tokens to the workload. The resource control module 124 may allocate tokens in a balanced manner with the goal to maintain SLO characteristics for all of the workloads.

In some embodiments, not all the SLO characteristics may be maintained for the workloads. The resource control module 124 may allocate the tokens and control resource allocation based on relative priorities between workloads based on the SLO. For example, the resource control module 124 may first ensure the settings for workloads having a premium SLO are maintained, then settings for workloads having a standard SLO are maintained and finally settings for workloads having a value SLO are maintained.

At block 214, the replication transfers may continue to be communicated based on the allocation of tokens. The replication transfers may be communicated based on a schedule assigned to the replication transfers, as discussed in more detail below.

Figure 3:
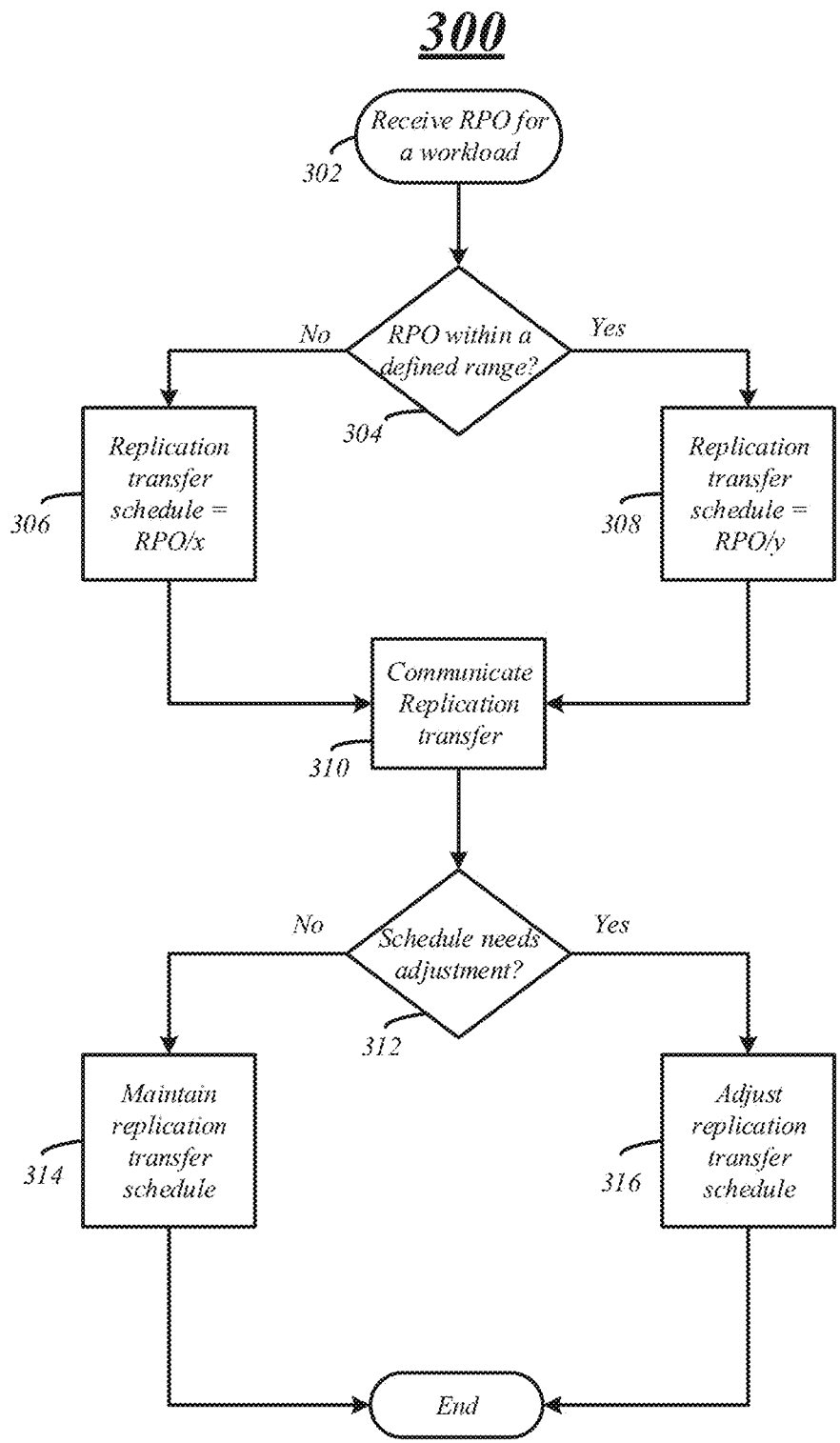
FIG. 3 illustrates a logic flow to schedule replication transfers.

FIG. 3 illustrates one exemplary embodiment of a logic flow 300 for scheduling replication transfers for a workload to replicate information on a backup or destination storage array. Logic flow 300 may be representative of some or all of the operations executed by one or more embodiments described herein. Logic flow 300 is discussed with reference to the cluster system of FIGS. 1A-1D for illustrative purposes. However, various embodiments are not limited in the manner and the logic flow may be implemented on any computing system or device.

At block 302, a RPO for a workload may be received by one or more processing components such as resource control module 124 as described above with respect to FIG. 1D. The RPO may be an amount of time in which information for a workload may be lost if a file system becomes corrupted, data is lost, or a failure occurs. The RPO may be configured by a system administrator of the system or a user whose information is being maintained on the system. The RPO may also be determined by a computer system based on one or more factors. For example, the RPO may be determined by an SLO chosen for the system. In various embodiments, the RPO may be in any unit of time such as seconds, minutes, hours or days and based on the needs of the user. For example, a user may choose a high RPO for less critical workloads or a low RPO for more critical workloads.

In various embodiments, a schedule may be determined for replication transfers to copy information from a source storage array to a destination storage array at block 306 or block 308. The schedule may be based on the RPO, and in particular, may be fraction of the RPO. At block 304, the resource control module 124 may determine whether the RPO is between a defined range, such as four minutes and 16 minutes. However, various embodiments are not limited to this range. At block 308, when the RPO is between the defined range the resource control module 124 may schedule the replication transfers for a workload to occur every RPO/y interval, where y equals four in some embodiments. However at block 306, if the RPO is not between the defined range, the resource control module 124 may schedule the replication transfers for a workload to occur every RPO/x interval, where x is two in some embodiments.

A replication transfer may include one or more messages or packets having information and communicated between the source storage array and the destination storage array at block 310. In various embodiments, each replication transfer may include the information stored or changed on the source storage array by a client 102 since the last replication transfer. In other words, the replication transfer may be the delta changes for the workload since the previous replication transfer.

At decision block 312, the resource control module 124 may determine if the schedule for the replication transfer needs adjusted. For example, the resource control module 124 may monitor the replication transfer and determine if the replication transfer has completed copying or communicating the information to the destination storage array before the next replication transfer for the workload is scheduled to begin. If not, the schedule for the replication transfer may be adjusted. In some embodiments, the schedule for the replication transfer may be adjusted if the transfer completes well within the time slice allocated to the transfer. For example, if the replication transfer completes in half the amount of time or less than what was allocated to the replication, the schedule for the replication transfer may be adjusted.

If at block 312, the resource control module 124 determines that the schedule for the replication transfer does not need to be adjusted, the schedule may be maintained at block 314. However, if the replication transfer fails to finish before the next replication transfer is scheduled to begin; the resource control module 124 may adjust the schedule for replication transfers to occur more frequently such that less information is transferred during each replication transfer at block 316. In addition, if the resource control module 124 determines that the replication transfer completed well within the time slice allocated to the transfer, the next replication transfer to occur may be skipped. This situation may occur when the amount of data transferred during the time slice is low and skipping the next replication transfer may be done without compromising information. Various embodiments are not limited in this manner.

Figure 4:
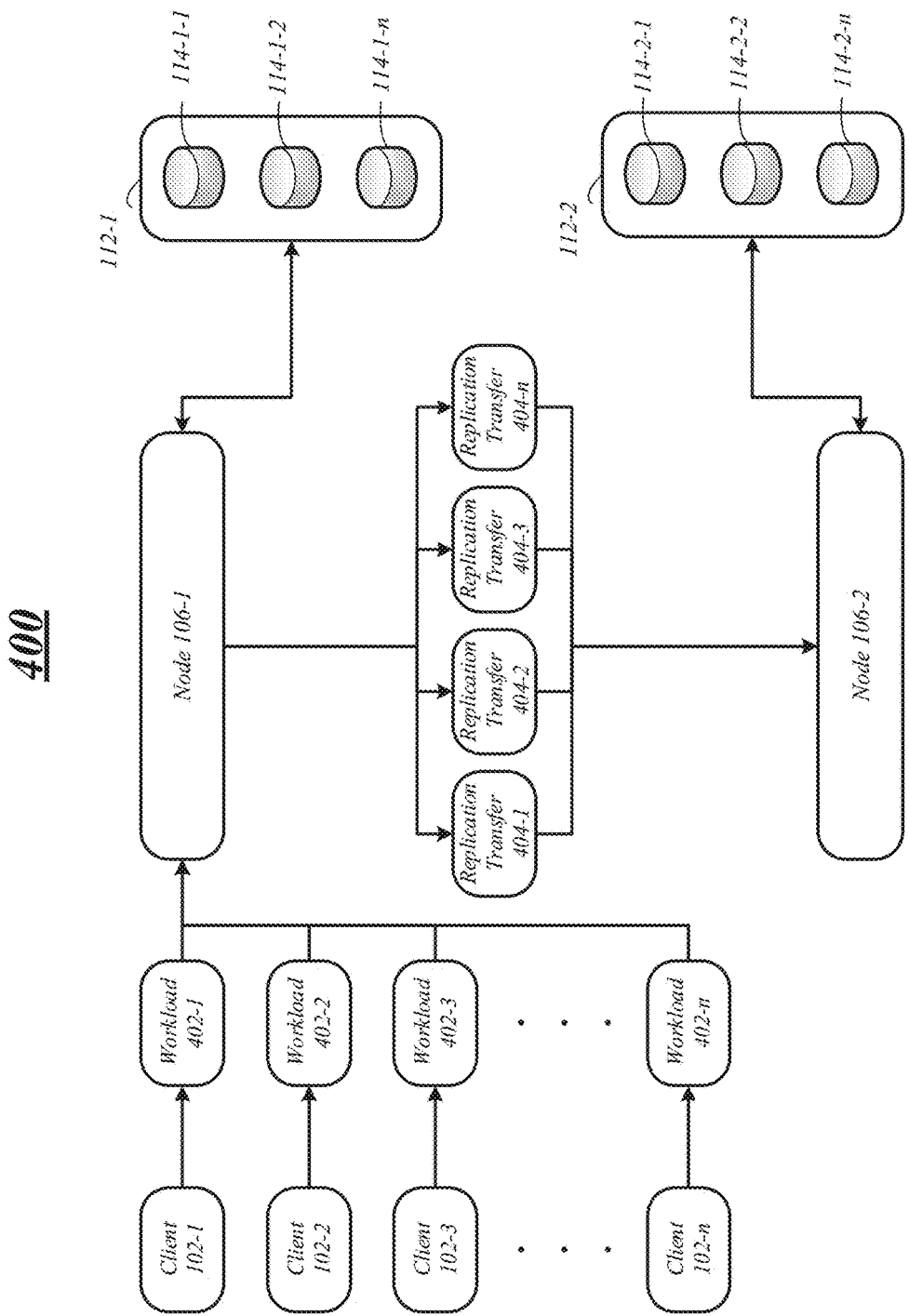
FIG. 4 illustrates an exemplary embodiment of a replication flow diagram.

FIG. 4 illustrates an exemplary embodiment of a data flow diagram 400 for conducting replication transfers for workloads. More specifically, FIG. 4 illustrates clients 102-1-102-n having corresponding workloads 402-1-402-n hosted on a cluster system including nodes 106-1 and 106-2. As similarly discussed above with respect to FIG. 1A-1D, nodes 106-1 and 106-2 may be coupled with corresponding storage arrays 112-1 and 112-2 having a plurality of storage disks 114. Clients 102, nodes 106, storage arrays 112 and storage devices 114 may be same as or similar to the like named devices discussed above in FIGS. 1A-1D.

In this illustrative embodiment, node 106-1 may be the source node or primary node and node 106-2 may be the destination node or secondary node. Clients 102 may communicate information for each of the workloads 402 with node 106-1. The information may be any type of information and may be stored on the storage array 112-1 in a persistent manner. The node 106-1 may communicate a replication transfer 404 for each of the workloads 402 to create a duplicate or backup on storage array 112-2. The replication transfers may be communicated to the node 106-2 on a continuous, non-continuous, periodic, or non-periodic basis, as previously discussed. For example, each replication transfer 404 may be communicated based on a schedule determined from a RPO set for the workload 402 corresponding to replication transfers 404.

The replication transfers 404 may be communicated as one or more message or packets having information for the workload stored on storage 112-1. In various embodiments, the replication transfers 404 may be co-communicated either simultaneously, in overlapping fashion, or in non-overlapping fashion. As previously discussed, tokens may be allocated to read requests and write requests for communication of the replication transfers 404. More specifically, each read request and each write request may require a token to be processed.

Various embodiments are not limited to the illustrative embodiment illustrate in FIG. 4. For example, in some embodiments the clients 102 may communicate with both nodes 106-1 and 106-2. Further, FIG. 4 illustrates each client having its own workload 402. However in some embodiments, a client 102 may have multiple workloads 402. For example, Client 102-1 may communicate information for each workload 402-1-402-n for storage on storage array 112-1.

FIG. 5A illustrates an exemplary embodiment of table having a plurality of settings for workloads. Various embodiments are not limited to this exemplary embodiment, and a workload may have any number of settings. FIG. 5A illustrates three workloads having various characteristics or settings that may be used when processing the workloads by a cluster system. More specifically, FIG. 5A shows three workloads, 402-1, 402-2 and 403-3 as three columns and settings as rows. The settings illustrated in FIG. 5A are RPO settings 502, SLO settings 504, priority level settings 506 and replication schedule settings 508.

In various embodiments, the RPO setting 502 may be determined for each workload 402 and the SLO setting 504, priority setting 506 and Replication Schedule 508 may be derived from the RPO setting 502. However, in some embodiments the SLO setting 504, priority setting 506 and Replication Schedule 508 may be a default setting or a user setting. In addition, the RPO setting 502 may be a selected by a user or system administrator or may be a default setting. In some embodiments, the RPO setting 502 may be derived from other settings. Various embodiments are not limited to the above settings for the workloads 404 and other settings may exist for the workloads 404.

FIG. 5A illustrates workload 402-1 having an RPO setting 502 of 12 minutes, an SLO setting 504 of premium, a priority level 506 of high and a replication schedule 508 of three minutes. As previously discussed, the RPO setting 502 for the workload 402-1 may be used to derive the other settings for the workload 402-1. For example, the SLO setting 504 may be determined based the RPO setting being within a range of times for a particular SLO. In one exemplary embodiment, a premium SLO will have a range from zero to 16 minutes for an RPO time, a standard SLO will have a range from 16 minutes to four hours for an RPO time and a value SLO will have a range for any time greater than 4 hours.

In another example, the priority level 506 may also be directly derived from the RPO setting 502 or directly from the SLO setting 504. Specifically, a premium SLO may have the highest priority level, a standard SLO may have a middle priority level and a value SLO may have a lower priority level.

In a third example, the replication schedule setting 508 may also be derived from the RPO setting 502. Specifically, the replication schedule setting 508 may be a fraction of the RPO setting 502. In some embodiments, the replication schedule may be the RPO setting/4 for any RPO setting between 4 minutes and 16 minutes and may be RPO setting/2 for any other RPO setting, as previously discussed above with respect to FIG. 3.

FIG. 5A illustrates example settings for workloads 402-2 and 402-3 based on the above discussion. Workload 402-2 may have a RPO setting 502 of 1 hour, a SLO setting 504 of standard and priority level setting 506 of middle and a replication schedule setting 508 of 30 minutes. Workload 402-3 has an RPO setting 502 of 4 hours, a SLO setting 504 of value, a priority level setting 506 of lowest and a replication schedule setting 508 of 2 hours. Various embodiments are not limited to these examples.

Figure 5B:
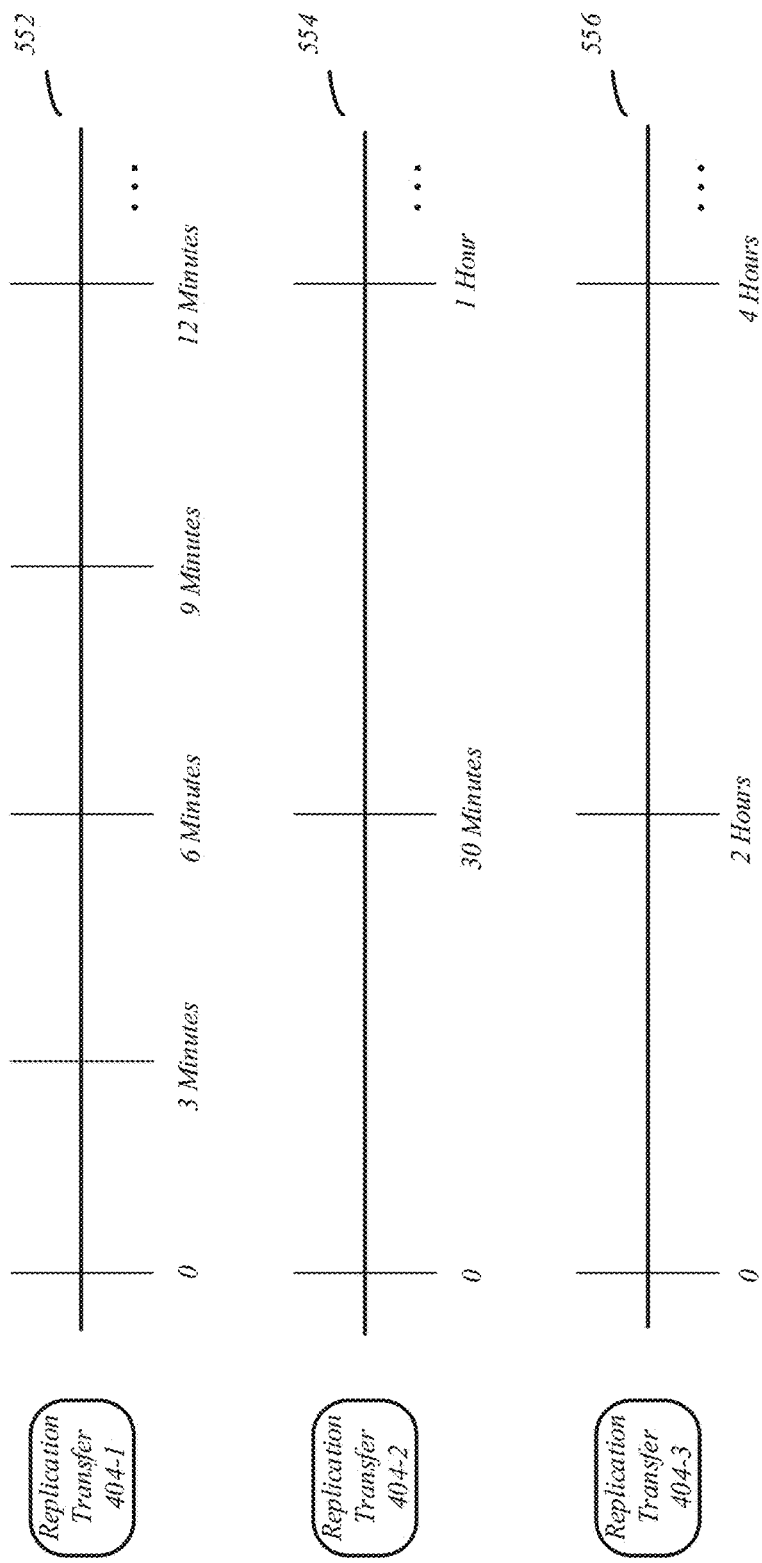
FIG. 5B illustrates an exemplary embodiment of a replication transfer schedule.

FIG. 5B illustrates an exemplary embodiment of replication transfer scheduling timelines for workloads. Various embodiments are not limited to the illustrative examples in FIG. 5B, and replication transfer may be communicated on any schedule based on the RPO for the associated workload.

The schedules illustrated in 5B may be based on the setting previously discussed with respect to FIG. 5A for replication transfers 404-1, 404-2 and 404-3 corresponding with workloads 402-1, 402-2 and 40-3, respectively. More specifically, FIG. 5B illustrates a schedule 552 for replication transfer 404-1 corresponding with workload 402-1 having an RPO setting 502 of 12 Minutes and an replication schedule setting 508 of 3 minutes or (12 Minutes/4). Thus, starting with time 0, the replication transfer 404-1 will be communicated from a source node to a destination node on a periodic basis repeating every 3 minutes. As previously discussed the replication transfer 404-1 may be communicated as one or more messages or packets and may include the delta information that has changed since the previously replication transfer for the workload 402-1.

In addition, the replication transfer schedule 552 may be adjusted based on whether the replication transfer 404-1 finishes within the time slice or before the next replication transfer 404-1 is to occur. The replication transfer schedule 552 may also be adjusted when the replication transfer 404-1 completes well within the time slice allocated to the transfer. For example, if the replication transfer 404-1 completes in half the amount of time of the slice or less than what was allocated to the replication, the schedule for the replication transfer may be adjusted.

FIG. 5B also illustrates a transfer schedule 554 for replication transfer 404-2 corresponding with workload 402-2 and a transfer schedule 556 for replication transfer 404-3 corresponding with workload 402-3. The transfer schedules 554 and 556 are also based on the settings previously discussed with respect to FIG. 5A. More specifically, schedule 554 illustrates the replication transfer 404-2 for workload 402-2 occurring every 30 minutes based on an RPO setting 502 of 1 Hour. Schedule 556 illustrates the replication transfer 404-3 for workload 402-3 occurring every 2 hours based on an RPO setting 502 of 4 hours. As similar discussed, the replication transfer schedules 554 and 556 may be continuously adjusted.

FIG. 6 illustrates an embodiment of logic flow 600. The logic flow 600 may be representative of some or all of the operations executed by one or more embodiments described herein. For example, the logic flow 600 may illustrate operations performed by systems of FIGS. 1A-1D and FIG. 4. However, various embodiments are not limited in this manner.

In the illustrated embodiment shown in FIG. 6, the logic flow 600 may include receiving a RPO for a workload, the RPO comprising an amount of time in which information for the workload will be lost if a failure occurs at block 605. In various embodiments, the RPO may be received from a user or system administrator of the system, may be a default setting, or based on other settings. For example, the RPO may be derived from a SLO or other settings for the system.

At block 610, the logic flow 600 may include determining a SLO for a replication transfer based on the RPO, the replication transfer to replicate information on a destination device to maintain the RPO. The SLOs may define ranges for the RPO and the SLO may be determined by whichever range the RPO is within.

In various embodiments, the logic flow 600 may include dynamically controlling resources to replicate the information on the destination device based on the SLO, at block 615. Resources such as one or more of a processing unit, a memory, and a network interface may be controlled and allocated to replicate the information on the destination device. In some embodiments, the resources may be controlled or allocate by utilizing a token system. Tokens may be used to control when information for a replication transfer may be read from the source storage array and written to the destination storage array. By controlling the distribution of tokens to the replication transfer, usage of the resources such as the processing unit, the memory and the networking interface may also be controlled. More specifically, the replication transfers usage of the resources may be directly related to the allocation of tokens. For example, more tokens allocated to a replication transfer will cause the transfer to utilize more processing cycles, memory read/writes, networking bandwidth, and so forth. However, less tokens allocated to a replication transfer will cause the transfer to utilize less processing cycles, memory read/writes and networking bandwidth for the same amount of time.

At block 620, the logic flow may include communicating information for the replication transfer from a source device to the destination device. As previously discussed, the information for the replication transfer may be communicated as one or more messages or packets. In some embodiments, each of the one or more messages or packets may correspond to the usage of two tokens. For example, one token may be used to retrieve or read the information for the packet on the source device and one token may be used to write the information in the packet on the destination device. Various embodiments are not limited in this manner.

FIG. 7 illustrates an exemplary embodiment of hardware architecture of a cluster node 700. In some embodiments, cluster node 700 may be the same or similar as one of the cluster nodes 106 included in the storage system 100. Cluster node 700 may include processor 702, memory 704, storage operating system 706, network adapter 708 and storage adapter 710. In various embodiments, the components of cluster node 700 may communicate with each other via one or more interconnects, such as one or more traces, buses and/or control lines.

Processor 702 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In various embodiments, cluster node 700 may include more than one processor.

In one embodiment, cluster node 700 may include a memory unit 704 to couple to processor 702. Memory unit 704 may be coupled to processor 702 via an interconnect, or by a dedicated communications bus between processor 702 and memory unit 704, which may vary as desired for a given implementation. Memory unit 704 may be implemented using any machine-readable or computer-readable media capable of storing data, including both volatile and non-volatile memory. In some embodiments, the machine-readable or computer-readable medium may include a non-transitory computer-readable storage medium, for example. The embodiments are not limited in this context.

The memory unit 704 may store data momentarily, temporarily, or permanently. The memory unit 704 may store instructions and data for cluster node 700. The memory unit 704 may also store temporary variables or other intermediate information while the processor 702 is executing instructions. The memory unit 704 is not limited to storing the above discussed data; the memory unit 704 may store any type of data. In various embodiments, memory 704 may store or include storage operating system 706

In various embodiments, cluster node 700 may include storage operating system 706 to control storage operations on the cluster node 700. In some embodiments, storage operating system 706 may be stored in memory 704 or any other type of storage device, unit, medium, and so forth. The storage operating system 706 may implement a write-anywhere file system that cooperates with virtualization modules to "virtualize" the storage space provided on the storage arrays and storage devices. The file system may logically organize the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of logical data blocks on the disks that are exported as logical unit numbers (LUNs).

The network adapter 708 may include the mechanical, electrical and signaling circuitry needed to connect the cluster node 700 to one or more hosts and other storage systems over a network, which may include a point-to-point connection or a shared medium, such as a local area network.

In various embodiments, the storage adapter 710 cooperates with the operating system 706 executing on the cluster node 700 to access information requested by a host device, guest device, another storage system and so forth. The information may be stored on any type of attached array of writable storage device media such as video tape, optical, DVD, magnetic tape, bubble memory, electronic random access memory, micro-electro mechanical and any other similar media adapted to store information, including data and parity information. Further, the storage adapter 710 includes input/output (I/O) interface circuitry that couples to the disks over an I/O interconnect arrangement, such as a conventional high-performance, FC serial link topology.

Figure 8:
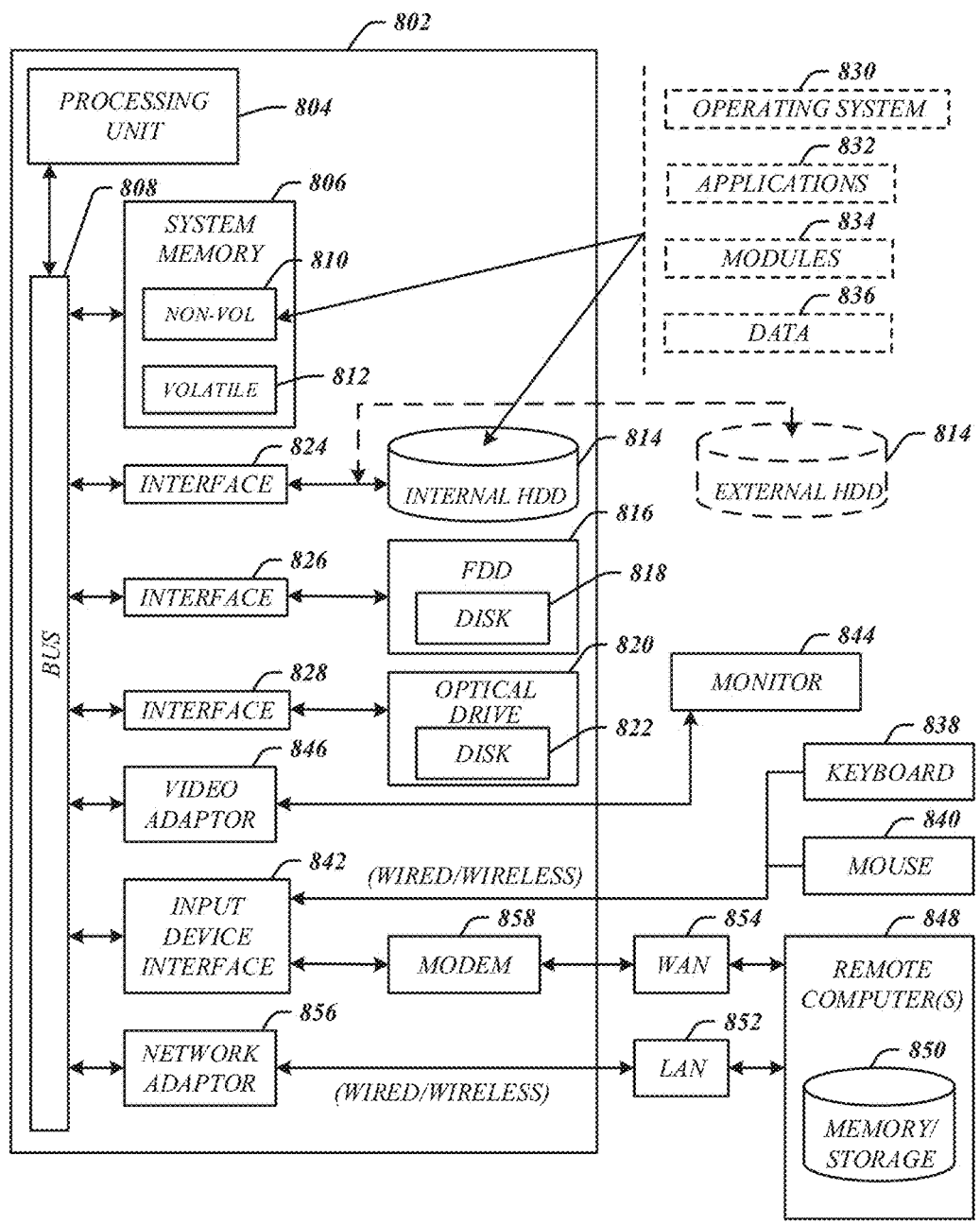
FIG. 8 illustrates an embodiment of a first computing architecture.

FIG. 8 illustrates an embodiment of an exemplary computing architecture 800 suitable for implementing various embodiments as previously described. In one embodiment, the computing architecture 800 may include or be implemented as part of computing system, such as storage systems 100, 125, 150 and 175.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the storage system 100, 125, 150, and 175 as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   receiving a recovery point objective for a workload, the recovery point objective comprising an amount of time in which information for the workload will be lost if a failure occurs;
   determining a service level objective for a replication transfer based on the recovery point objective, the replication transfer to replicate information from a node to a second node to maintain the recovery point objective;
   dynamically controlling one or more resources to replicate the information to the second node based on the service level objective;
   assigning priority and resource delegations to client traffic and the replication transfer;
   maintaining a resource pool of tokens, wherein a token comprises a message data structure obtainable by a replication engine for making a transfer request for performing I/O of the replication transfer;
   adjusting a frequency at which tokens are allocated from the resource pool of tokens to the replication engine for replication transfers, wherein an adjusted frequency corresponds to an increase or decrease in a frequency at which tokens are assigned to the replication engine from the resource pool of tokens; and
   communicating information for the replication transfer from the node to the second node.

2. The method of claim 1, comprising:
   adjusting a number of tokens within the resource pool based upon a bandwidth factor.

3. The method of claim 1, the dynamically controlling one or more resources comprising:
   dynamically allocating tokens to read requests and write requests to communicate the information for the replication transfer.

4. The method of claim 1, the recovery point objective comprising a time within one of a plurality of service level objective ranges for service level objectives, the service level objective ranges including a premium service level objective range for a premium service level objective, a standard service level objective range for a standard service level objective, and a value service level objective range for a value service level objective.

5. The method of claim 1, comprising:
   increasing a number of tokens within the resource pool based upon a determination that client traffic latency is below a threshold latency.

6. The method of claim 1, comprising:
   adjusting the frequency of token allocation based upon a bandwidth factor.

7. The method of claim 1, comprising:
   adjusting the frequency of token allocation based upon a latency factor.

8. The method of claim 1, comprising:
   determining a transfer schedule for a plurality of replication transfers based on the recovery point objective, the transfer schedule comprising a periodic time to initiate a target replication transfer based on a fraction of the recovery point objective; and
adjusting the transfer schedule to lengthen a time between replication transfers based upon replication transfers completing within a threshold amount of time less than an allotted time.

9. The method of claim 1, comprising:
initiating an alert when a percentage of replication transfers for the workload fail to finish within a predefined time based on the service level objective for the workload.

10. The method of claim 1, comprising:
reducing a number of tokens within the resource allocation pool based upon a detected decrease in client traffic latency.

11. A non-transitory computer-readable storage medium comprising a plurality of instructions that, when executed by processing circuitry, enable the processing circuitry to:
receive a recovery point objective for a workload, the recovery point objective comprising an amount of time in which information for the workload will be lost if a failure occurs;
determine a service level objective for a replication transfer based on the recovery point objective, the replication transfer to replicate information from a device to a second device to maintain the recovery point objective;
dynamically control resources to replicate the information to the second device based on the service level objective;
assign priority and resource delegations to client traffic and the replication transfer;
maintain a resource pool of tokens, wherein a token comprises a message data structure obtainable by a replication engine for making a transfer request for performing I/O of the replication transfer;
adjust a frequency at which tokens are allocated from the resource pool of tokens to the replication engine for replication transfers, wherein an adjusted frequency corresponds to an increase or decrease in a frequency at which tokens are assigned to the replication engine from the resource pool of tokens; and
communicate information for the replication transfer from the device to the second device.

12. The non-transitory computer-readable storage medium of claim 11, comprising a plurality of instruction that when executed enable processing circuitry to:
dynamically allocate tokens to read requests and write requests to communicate the information for the replication transfer.

13. The non-transitory computer-readable storage medium of claim 11, the recovery point objective comprising a time within one of a plurality of service level objective ranges for service level objectives, the service level objective ranges including a premium service level objective range for a premium service level objective, a standard service level objective range for a standard service level objective, and a value service level objective range for a value service level objective.

14. The non-transitory computer-readable storage medium of claim 11, wherein the client traffic is assigned a higher priority than the replication transfer if the service level objective is a standard service level objective, and wherein the client traffic is assigned a lower priority than the replication transfer if the service level objective is a premium service level objective.

15. The non-transitory computer-readable storage medium of claim 14, comprising a plurality of instruction that when executed enable processing circuitry to:
dynamically allocate more tokens to read requests and write requests for replication transfers for the premium service level objective than to read requests and write requests for replication transfers for the standard service level objective and a value service level objective, and to dynamically allocate more tokens for read requests and write requests for replication transfers for the standard service level objective than to read requests and write requests for replication transfers for the value service objective.

16. The non-transitory computer-readable storage medium of claim 14, comprising a plurality of instructions that when executed enable processing circuitry to:
dynamically allocate more tokens to read requests and write requests for replication transfers for the premium service level objective than to read requests and write requests for the client traffic.

17. The non-transitory computer-readable storage medium of claim 11, comprising a plurality of instructions that when executed enable processing circuitry to:
determine a transfer schedule for a plurality of replication transfers based on the recovery point objective, the transfer schedule comprising a periodic time to initiate a target replication transfer based on a fraction of the recovery point objective.

18. The non-transitory computer-readable storage medium of claim 11, comprising a plurality of instructions that when executed enable processing circuitry to:
initiate an alert when a percentage of replication transfers for the workload fail to finish within a predefined time based on the service level objective for the workload.

19. A computing device, comprising:
a memory; and
a processor unit coupled with the memory, the processor unit to:
receive a recovery point objective for a workload, the recovery point objective comprising an amount of time in which information for the workload will be lost if a failure occurs;
determine a service level objective for a replication transfer based on the recovery point objective, the replication transfer to replicate information from a device to a second device to maintain the recovery point objective;
dynamically control resources to replicate the information to the second device based on the service level objective;
assign priority and resource delegations to client traffic and the replication transfer;
maintain a resource pool of tokens, wherein a token comprises a message data structure obtainable by a replication engine for making a transfer request for performing I/O of the replication transfer;
adjust a frequency at which tokens are allocated from the resource pool of tokens to the replication engine for replication transfers, wherein an adjusted frequency corresponds to an increase or decrease in a frequency at which tokens are assigned to the replication engine from the resource pool of tokens; and
communicate information for the replication transfer from the device to the second device.

20. The computing device of claim 19, the processor unit to:

reduce a number of tokens within the resource pool of tokens in order to maintain a client traffic latency requirement.

21. The computing device of claim 19, the recovery point objective comprising a time within one of a plurality of service level objective ranges for service level objectives, the service level objective ranges including a premium service level objective range for a premium service level, a standard service level objective range for a standard service level, and a value service level objective range for a value service level.

22. The computing device of claim 21, the processor unit to:

dynamically allocate more tokens to read requests and write requests for replication transfers for the premium service level objective than to read requests and write requests for replication transfers for the standard service level objective and the value service level objective, and to dynamically allocate more tokens for read requests and write requests for replication transfers for the standard service level objective than to read requests and write requests for replications for the value service objective.

23. The computing device of claim 21, the processor unit to:

dynamically allocate more tokens to read requests and write requests for replication transfers for the premium service level objective than to read requests and write requests for client traffic.

24. The computing device of claim 19, the processor unit to:

assign two tokens for a replication transfer, wherein a first token is to read from a replication source and a second token is to write to a replication destination.

25. The computing device of claim 19, the processor unit to:

initiate an alert when a percentage of replication transfers for the workload fail to finish within a predefined time based on the service level objective for the workload.

* * * * *